US008645316B2

(12) United States Patent
Wilensky

(10) Patent No.: US 8,645,316 B2
(45) Date of Patent: *Feb. 4, 2014

(54) STORING RECORDS IN DATABASES IN A RANDOMIZED MANNER TO EFFECTIVELY UTILIZE DATABASE SERVERS

(75) Inventor: Howard F. Wilensky, Minneapolis, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/210,864

(22) Filed: Aug. 16, 2011

(65) Prior Publication Data

US 2013/0046729 A1 Feb. 21, 2013

(51) Int. Cl.
*G06F 17/30* (2006.01)
(52) U.S. Cl.
USPC .......................................... 707/609; 707/802
(58) Field of Classification Search
USPC .................. 707/609, 802, 809, 812, 999.103
See application file for complete search history.

(56) References Cited

U.S. PATENT DOCUMENTS

| 7,562,075 | B2 * | 7/2009 | Kumar ................................. 1/1 |
| 7,765,215 | B2 * | 7/2010 | Hsu et al. ...................... 707/742 |
| 8,073,263 | B2 * | 12/2011 | Hull et al. ...................... 382/224 |
| 2007/0027838 | A1 | 2/2007 | Newport et al. |
| 2009/0157777 | A1 * | 6/2009 | Golwalkar et al. ............ 707/205 |
| 2009/0210429 | A1 * | 8/2009 | Agrawal et al. ................. 707/10 |
| 2010/0106934 | A1 | 4/2010 | Calder et al. |

FOREIGN PATENT DOCUMENTS

WO 2007137133 A2 11/2007

OTHER PUBLICATIONS

Office Action from U.S. Appl. No. 13/405,264 dated Jun. 20, 2012.
Office Action for U.S. Appl. No. 13/405,264 dated Jan. 3, 2013.

* cited by examiner

*Primary Examiner* — Monica Pyo
(74) *Attorney, Agent, or Firm* — Robert A. Voigt, Jr.; Winstead, P.C.

(57) ABSTRACT

A system and computer program product for effectively utilizing database servers. A middle tier system, interfacing between clients and a database system, receives requests to create, delete or update a record from a client. An index is used by the middle tier system to determine if a record previously exists, and if so, its current record location. In this manner, the middle tier system keeps track of the locations of the records stored in the databases. By keeping track of the data load, the middle tier system identifies the most available resource to store the records. When a record is to be created, deleted or updated, the middle tier system rebalances the load capability of the database servers by distributing the data across the databases in a randomized manner based on the server load. In this manner, changes to the server load are more effectively managed.

12 Claims, 6 Drawing Sheets

STORING RECORDS IN DATABASES IN A RANDOMIZED MANNER TO EFFECTIVELY UTILIZE DATABASE SERVERS

TECHNICAL FIELD

The present invention relates to databases, and more particularly to storing records in databases in a randomized manner to effectively utilize database servers.

BACKGROUND

A database is a collection of related information stored in a structured format. A database can consist of one or more tables of information that are related in some way. A table is a single store of related information. A table may consist of records, where each record is made up of a number of fields.

A database management system (DBMS) maintains and manages the data stored in the databases. Management includes storing, deleting, retrieving and updating the data. Typically, data stored in a database includes plain values (e.g., numbers and alphanumeric strings) and complex objects, such as images, documents and spatial data. The DBMS typically is hosted by a server, which may be referred to as a "database server," that is accessible by a plurality of client systems (or simply referred to as "clients") via a network.

The database servers, which may hold the databases, may receive requests for data from the clients and retrieve the requested data from the databases and return the requested data to the clients. In order to handle a high level of requests from the clients, additional servers may be added, such as forming what is referred to as a "server farm," thereby bringing more computing power online. However, in order to store additional data, the databases are often partitioned or divided to accommodate the expanding load. Unfortunately, partitioning or dividing a database is time consuming and can also affect performance and accessibility. For example, partitioning a database may affect the uptime guarantees stated in the applicable service level agreements. In another example, the application (e.g., business application) residing on the client attempting to access data may also be impacted, such as the manner in the way it accesses records.

Furthermore, in partitioning a database, the individual database tables may be distributed across several databases which increases the difficulty of managing the resources in the server farm. Additionally, each database vendor handles the partitioning of its database in differing ways. As a result, in a mixed vendor environment, the database administrator must understand each database server's unique characteristics in order to effectively scale each database.

Hence, there is currently not an effective solution in managing server load capability in the context of a database environment to accommodate changes in the load (e.g., expanding load).

BRIEF SUMMARY

In one embodiment of the present invention, a computer program product embodied in a computer readable storage medium for effectively utilizing database servers comprises the programming instructions for receiving, by a middle tier system, a request to create, delete or update a record. The computer program product further comprises the programming instructions for searching, by the middle tier system, an index to determine if the record is stored in a database. Additionally, the computer program product comprises the programming instructions for creating the record in response to the record not being identified in the index. Furthermore, the computer program product comprises the programming instructions for deleting or updating the record in response to the record being identified in the index. In addition, the computer program product comprises the programming instructions for rebalancing, by the middle tier system, a load capacity of a plurality of servers holding a plurality of databases based on server load in response to creating, deleting or updating the record.

Another form of the embodiment of the computer program product described above is in a system.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for effectively utilizing database servers. In one embodiment of the present invention, a middle tier system, interfacing between clients and a database system, receives requests to create, delete or update a record from a client. An index is used by the middle tier system to determine if a record previously exists, and if so, its current record location. In this manner, the middle tier system keeps track of the locations of the records stored in the databases. By keeping track of the data load, the middle tier system identifies the most available resource to store the records. When a record is to be created, deleted or updated, the middle tier system rebalances the load capability of the database servers by distributing the data across the databases in a randomized manner based on the server load and not based on other factors, such as relationships between the records, the particular data structure enacted by a particular database vendor, etc. In this manner, in the context of a database environment, changes to the server load are more effectively managed.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
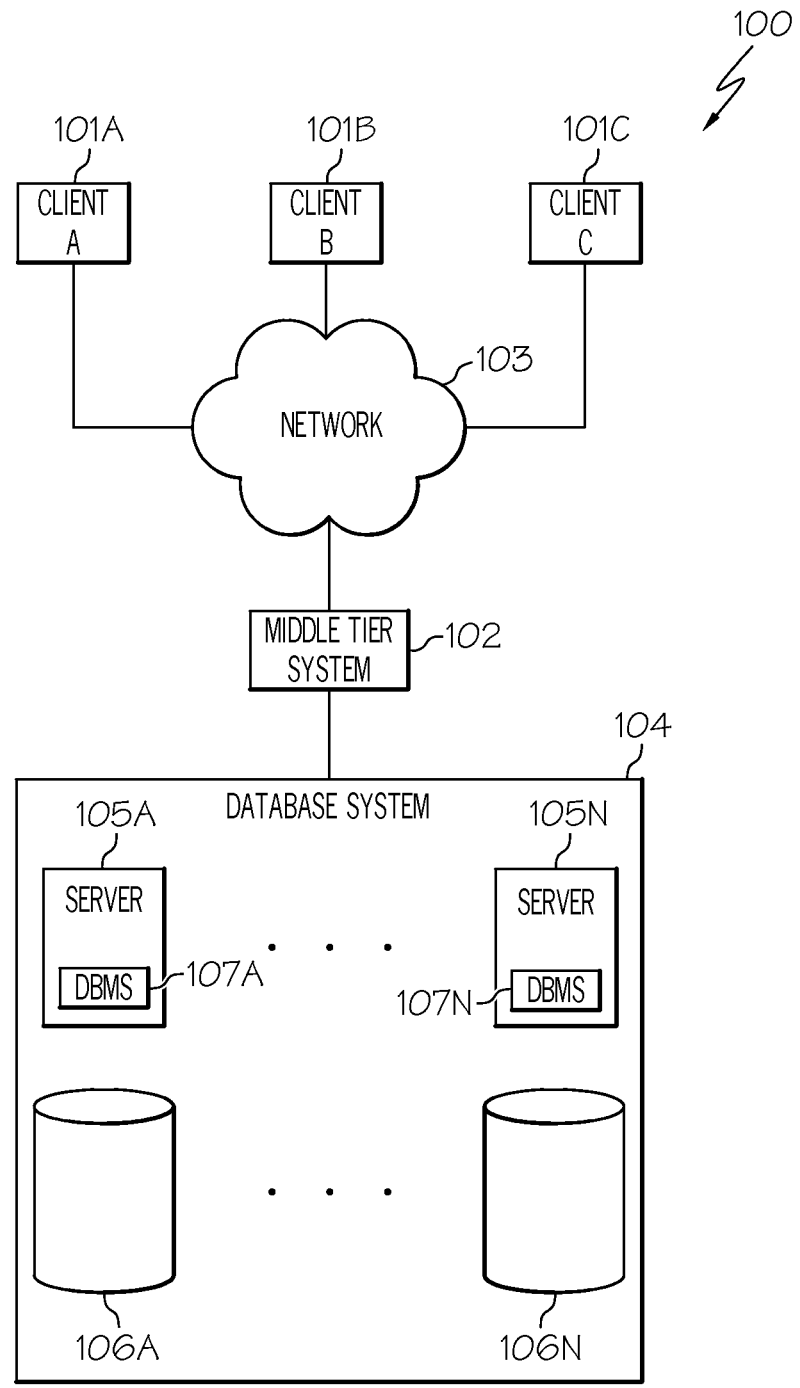
FIG. 1 illustrates an embodiment of the present invention of a network system.

Referring now to the Figures in detail, FIG. 1 illustrates a network system 100 configured in accordance with an embodiment of the present invention. Network system 100 includes clients 101A-101C (identified as "Client A," "Client B," and "Client C," respectively in FIG. 1) connected to a middle tier system 102 via network 103. Clients 101 may collectively or individually be referred to as clients 101 or client 101, respectively. Client 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to network 103 and consequently communicating with database system 104 as discussed below.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Network system 100 further includes a database system 104 connected to middle tier system 102. While middle tier system 102 is shown to be directly connected to database system 104, middle tier system 102 may be connected to database system 104 via a network (not shown), similar to network 103. Database system 104 contains one or more servers (or referred to as "database servers") 105A-105N (where N can be any positive integer number) holding one or more databases 106A-106N (where N can be any positive integer number). Servers 105A-105N may collectively or individually be referred to as servers 105 or server 105, respectively. Databases 106A-106N may collectively or individually be referred to as databases 106 or database 106, respectively. Each server 105A-105N contains a database management system 107A-107N (where N can be any positive integer number) (identified as "DBMS" in FIG. 1), respectively, configured with the capability of maintaining and managing the data stored in databases 106.

Clients 101 generate requests for service to middle tier system 102, at least some of these requests requiring access to information in the database(s) 106 of database system 104. Middle tier system 102 acts as a server to clients 101; it may provide various services to clients 101 (not all of which necessarily involve database access), but in particular it functions as an intermediary between the clients 101 and database system 104 in handling client requests to access information in database 106. Where necessary to provide a requested service, middle tier system 102 uses the client request for information in a general form to generate one or more requests to server 105 of database system 104 in a specific form required by database 106 to be accessed. Server 105 generates responses to those requests (e.g., copies of selective information, results of queries, acknowledgments of changes made to the information, etc.), which are transmitted to middle tier system 102, and used by middle tier system 102 to provide response to clients 101. Middle tier system 102, which handles all direct interaction with clients 101, appears to clients 101 as the server. From the perspective of database system 104, middle tier system 102 functions as a representative of multiple clients to transmit and receive information from clients 101. A description of an embodiment of a hardware configuration of middle tier system 102 is provided below in connection with FIG. 2.

FIG. 1 is intended to represent a typical environment at a high level of generality, and is not intended to represent all components of an environment in detail, or all possible permutations of an environment for accessing a database. Numerous variations of the environmental representation of FIG. 1 are possible, of which the following in particular are possible, the description of particular variations herein being intended by way of example only and not by way of limitation. For example, embodiments of the present invention discussed herein may be implemented in several environments, including a cloud environment. Furthermore, although clients 101, middle tier system 102 and database system 104 are shown as separate and distinct entities, some or all of these may in fact be combined.

Figure 2:
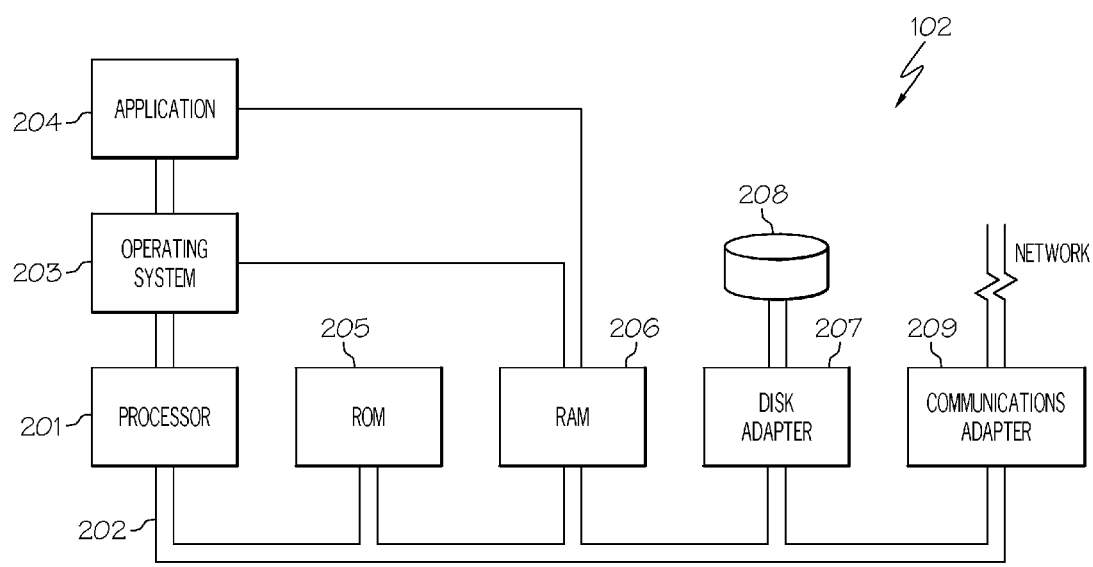
FIG. 2 illustrates a hardware configuration of a middle tier system in accordance with an embodiment of the present invention.

Referring now to FIG. 2, FIG. 2 illustrates a hardware configuration of middle tier system 102 (FIG. 1) which is representative of a hardware environment for practicing the present invention. Referring to FIG. 2, middle tier system 102 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for effectively utilizing database servers 105, as discussed further below in association with FIGS. 3-6.

Referring again to FIG. 2, read-only memory ("ROM") 205 is coupled to system bus 202 and includes a basic input/output system ("BIOS") that controls certain basic functions of middle tier system 102. Random access memory ("RAM") 206 and disk adapter 207 are also coupled to system bus 202. It should be noted that software components including operating system 203 and application 204 may be loaded into RAM 206, which may be middle tier system's 102 main memory for execution. Disk adapter 207 may be an integrated drive electronics ("IDE") adapter that communicates with a disk unit 208, e.g., disk drive. It is noted that the program for effectively utilizing database servers 105, as discussed further below in association with FIGS. 3-6, may reside in disk unit 208 or in application 204.

Middle tier system 102 may further include a communications adapter 209 coupled to bus 202. Communications adapter 209 interconnects bus 202 with an outside network thereby allowing middle tier system 102 to communicate with clients 101 and database system 104.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, in order to store additional data, the databases are often partitioned or divided to accommodate the expanding load. Unfortunately, partitioning or dividing a database is time consuming and can also affect performance and accessibility. For example, partitioning a database may affect the uptime guarantees stated in the applicable service level agreements. In another example, the application (e.g., business application) residing on the client attempting to access data may also be impacted, such as the manner in the way it accesses records. Furthermore, in partitioning a database, the individual database tables may be distributed across several databases which increases the difficulty of managing the resources in the server farm. Additionally, each database vendor handles the partitioning of its database in differing ways. As a result, in a mixed vendor environment, the database administrator must understand each database server's unique characteristics in order to effectively scale each database. Hence, there is currently not an effective solution in managing server load capability in the context of a database environment to accommodate changes in the load (e.g., expanding load).

Figure 3:
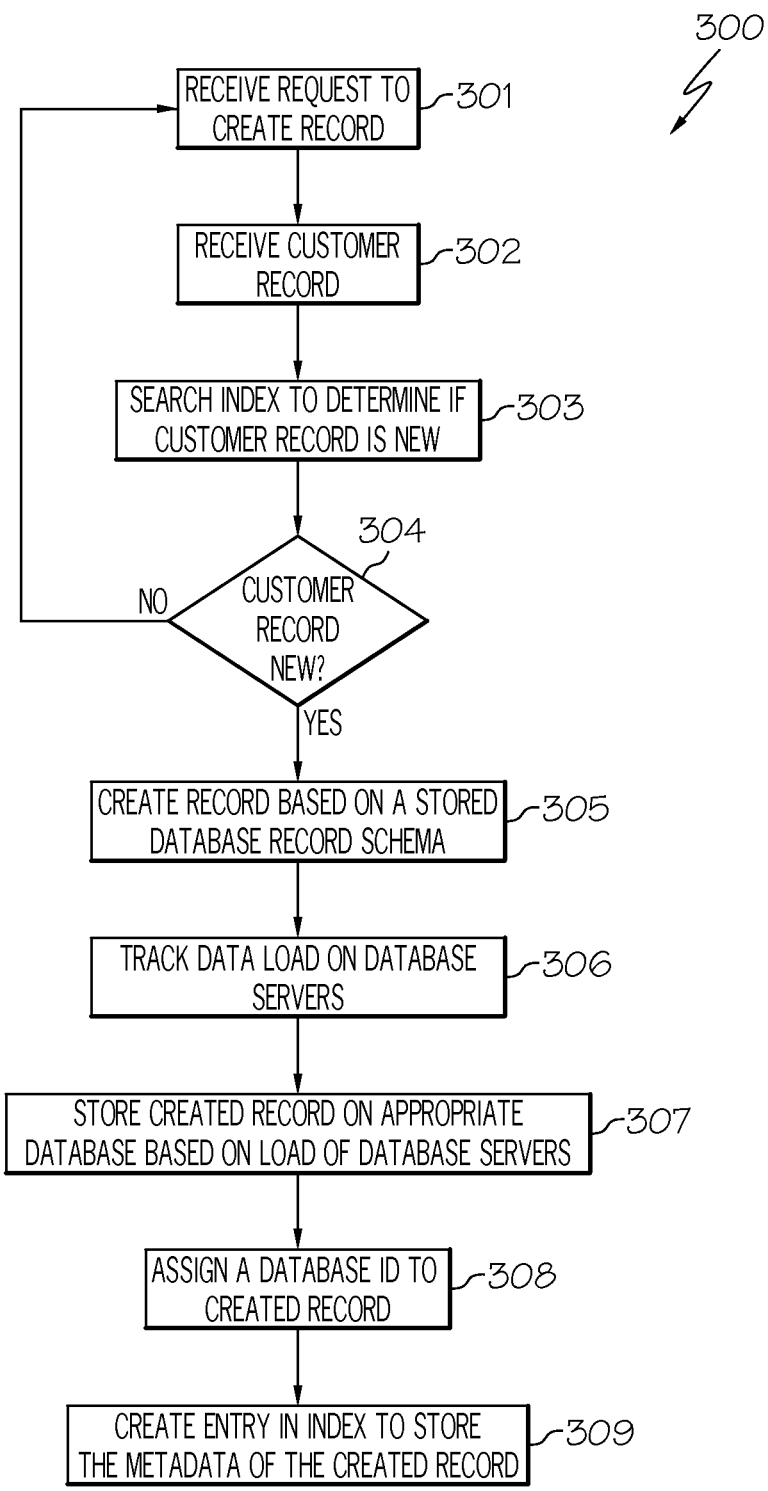
FIG. 3 is a flowchart of a method for handling a request to create a record in accordance with an embodiment of the present invention.
Figure 4:
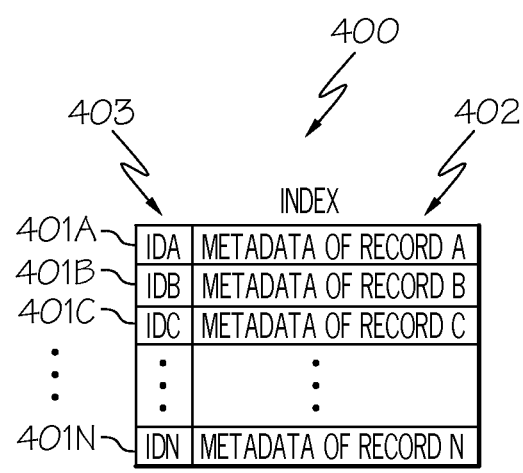
FIG. 4 illustrates an index containing record information stored as metadata in accordance with an embodiment of the present invention.
Figure 5:
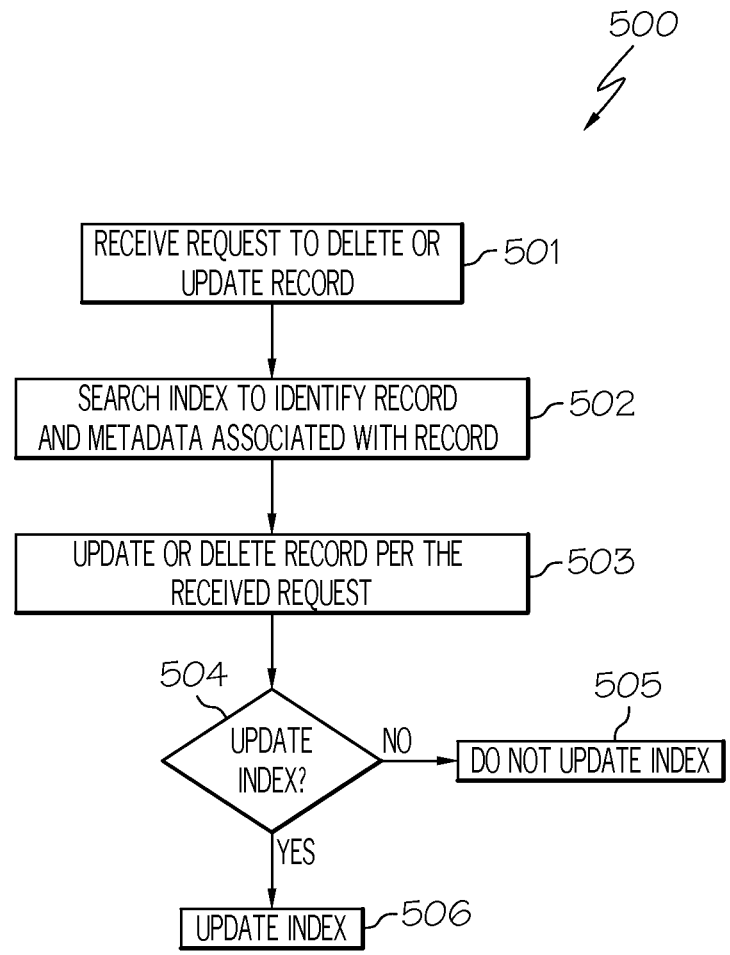
FIG. 5 is a flowchart of a method for handling a request to delete or update a record in accordance with an embodiment of the present invention.
Figure 6:
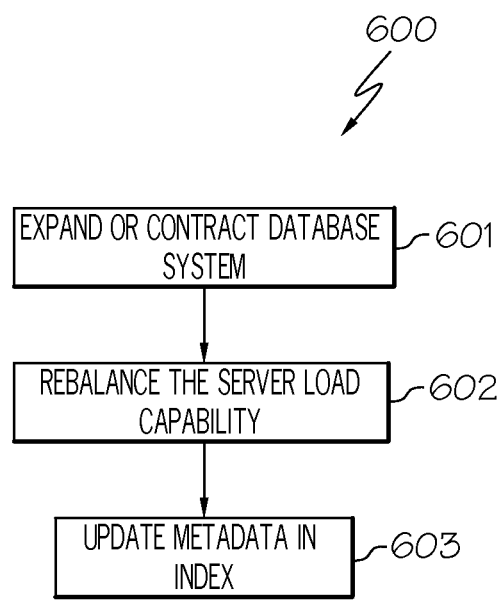
FIG. 6 is a flowchart of a method for rebalancing the load capacity of database servers in response to expanding or contracting the databases in accordance with an embodiment of the present invention.

The principles of the present invention provide a means for managing server load capacity in various scenarios, including expansion and contraction of the load as discussed below in connection with FIGS. 3-6. FIG. 3 is a flowchart of a method for handling a request to create a record. FIG. 4 illustrates an index storing metadata, which indicates the record location, status and parent/child relationships. FIG. 5 is a flowchart of a method for handling a request to delete or update a record. FIG. 6 is a flowchart of a method for rebalancing the load capacity of the database servers in response to expanding or contracting the databases (e.g., creating, deleting or updating records).

As stated above, FIG. 3 is a flowchart of a method 300 for handling a request to create a record in accordance with an embodiment of the present invention.

Referring to FIG. 3, in conjunction with FIGS. 1-2, in step 301, middle tier system 102 receives a request from client 101 to create a record.

In step 302, middle tier system 102 receives a customer record from client 101.

In step 303, middle tier system 102 searches an index to determine if the customer record is new. An "index," as used herein, refers to a table that contains metadata which indicates at least the following information: record location, status and parent/child relationships. Record location may indicate the location (e.g., row and column of a particular table) of database 106 storing the record in question. Status may indicate the state of the record, such as whether the record is valid or not. Parent/child relationships may indicate other records that are related to the record in question. Such relationships may be determined by data pointers that track record dependencies. An illustration of such an index is provided in FIG. 4.

Referring to FIG. 4, FIG. 4 illustrates an index 400 storing entries 401A-N (where N can be a positive integer number) containing metadata of a record as well as an identifier in accordance with an embodiment of the present invention. Entries 401A-N may collectively or individually be referred to as entries 401 or entry 401, respectively. In one embodiment, index 400 includes columns 402, 403, storing the metadata of the records as well as the associated identifiers, respectively. In one embodiment, the identifiers (indicated as "IDA," "IDB," IDC," . . . "IDN" in FIG. 4) may be generated based on the data stored in various fields of a record.

Returning to FIG. 3, in conjunction with FIGS. 1-2 and 4, in step 304, a determination is made by middle tier system 102 as to whether the customer record is new. As discussed above, the determination is based on searching index 400 in step 303. If the customer record is not new, then middle tier system 102 waits to receive a subsequent request to create a new record in step 301.

If, however, the customer record is new, then, in step 305, middle tier system 102 creates a record based on a stored database record schema. For example, a template may be used to create the record in question.

In step 306, middle tier system 102 tracks the data load on database servers 105. While the tracking step is shown subsequent to creating a record, it is noted for clarity that middle tier system 102 continuously tracks the data load on database servers 105.

In step 307, middle tier system 102 stores the created record on the appropriate database 106 based on the load of database servers 105. As will be explained in further detail below, middle tier system balances the load across the databases 106 so that database servers 105 are effectively utilized. If, for example, database system 104 has only two databases 106, and one of the two has more free space than the other, then the created record will be stored on the database 106 with the greater free space.

In step 308, middle tier system 102 assigns a database identifier (ID) to the created record which is used to identify database 106 storing the created record.

In step 309, middle tier system 102 creates an entry 401 in index 400 to store the metadata of the created record, including using the database identifier of step 308 identifying database 106 storing the created record to form part of the record locator metadata.

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

Middle tier system 102 may also receive requests from clients 101 to delete or update a record as discussed below in connection with FIG. 5.

FIG. 5 is a flowchart of a method 500 for handling a request to delete or update a record in accordance with an embodiment of the present invention.

Referring to FIG. 5, in conjunction with FIGS. 1-2 and 4, in step 501, middle tier system 102 receives a request to delete or update a record.

In step 502, middle tier system 102 searches index 400 to identify the record and the metadata associated with the record. In one embodiment, particular fields of a record may be used to generate an identifier of a record, which may be used to identify a particular entry 401 of index 400.

In step 503, middle tier system 102 updates or deletes the record per the received request.

In step 504, a determination is made by middle tier system 102 as to whether index 400 needs to be updated. For example, if the record is updated, then the metadata may need to be updated, such as the relationship the record has with another record, the status of the record, etc. In another example, if the record is deleted, then entry 401 corresponding to the deleted record is removed.

If index 400 does not need to be updated, then, in step 505, middle tier system 102 does not update index 400.

If, however, index 400 needs to be updated, then, in step 506, middle tier system 102 updates index 400 as discussed above.

In some implementations, method 500 may include other and/or additional steps that, for clarity, are not depicted. Further, in some implementations, method 500 may be executed in a different order presented and that the order presented in the discussion of FIG. 5 is illustrative. Additionally, in some implementations, certain steps in method 500 may be executed in a substantially simultaneous manner or may be omitted.

Upon creating, deleting or updating a record, database system 104 is expanded or contracted. Upon expansion or contraction of database system 104, middle tier system 102 rebalances the load across database servers 105 as discussed below in connection with FIG. 6.

FIG. 6 is a flowchart of a method 600 for rebalancing the load capacity of database servers 105 (FIG. 1) in response to expanding or contracting databases 106 (FIG. 1) (e.g., creating, deleting or updating records) in accordance with an embodiment of the present invention.

In step 601, database system 104 expands or contracts, such as by creating new database records, updating existing database records or deleting database records as discussed above. It is noted that "contraction," as used herein, includes compaction of database system 104 used for reducing the number of data elements without loss of information by eliminating unnecessary redundancy, removing irrelevancy, or using special coding.

In step 602, middle tier system 102 rebalances the load capability of database servers 105 based on server load. As discussed above, middle tier system 102 uses index 400 to keep track of the locations of the records stored in databases 106. By keeping track of the data load, middle tier system 102 identifies the most available resource to store the records. When a record is to be created, deleted or updated, middle tier system 102 rebalances the load capability of database servers 105 by distributing the data across the databases in a randomized manner based on the server load and not based on other factors, such as relationships between the records, the particular data structure enacted by a particular database vendor, etc. In this manner, in the context of a database environment, database servers 105 are more effectively utilized and changes to the server load are more effectively managed.

For example, when a new database server 105 is added to the server farm, it has 100% capacity. All subsequent new records may be stored on the newly added database server 105. Alternatively, if all of the current servers 105 are operating at 80% capacity, then with the addition of the newly added database server 105, the load on databases 106 may be rebalanced in such a manner that each database server 105 operates at 50% capacity. Hence, by distributing data based on server load and not based on other conditions, the data is distributed across databases 106 in such a manner that server utilization is improved and server load is better managed.

In step 603, middle tier system 102 updates the metadata in index 400 to reflect the changes made to the records (e.g., record locations) after the rebalancing of the server load.

In some implementations, method 600 may include other and/or additional steps that, for clarity, are not depicted. Further, in some implementations, method 600 may be executed in a different order presented and that the order presented in the discussion of FIG. 6 is illustrative. Additionally, in some implementations, certain steps in method 600 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer readable storage medium, wherein the medium does not include a propagating signal, comprising a computer program product for effectively utilizing database servers, the computer program product comprising the programming instructions for:
   receiving, by a middle tier system, a request to one of create, delete and update a record;
   searching, by said middle tier system, an index to determine if said record is stored in a database;
   creating said record in response to said record not being identified in said index;
   assigning a database identification to said created record;
   creating an entry in said index to store metadata of said created record, wherein said database identification forms part of said metadata;
   deleting or updating said record in response to said record being identified in said index; and
   rebalancing, by said middle tier system, a load capacity of a plurality of servers holding a plurality of databases based on server load in response to one of said creating, deleting and updating said record.

2. The computer readable storage medium as recited in claim 1, wherein the computer program product further comprises the programming instructions for:
   tracking data load of said plurality of servers holding said plurality of databases.

3. The computer readable storage medium as recited in claim 2, wherein the computer program product further comprises the programming instructions for:
   storing said created record on one of said plurality of databases based on said data load of said plurality of servers.

4. The computer readable storage medium as recited in claim 1, wherein the computer program product further comprises the programming instructions for:
   updating said index in response to said deleting or updating of said record.

5. The computer readable storage medium as recited in claim 1, wherein the computer program product further comprises the programming instructions for:
   updating said index in response to said rebalancing of said load capacity of said plurality of servers.

6. The computer readable storage medium as recited in claim 1, wherein said index comprises metadata indicating record location, status and parent/child relationships.

7. A middle tier system interfacing between clients and a database system, comprising:
   a memory unit for storing a computer program for effectively utilizing database servers; and
   a processor coupled to said memory unit, wherein said processor, responsive to said computer program, comprises
      circuitry for receiving a request to one of create, delete and update a record;
      circuitry for searching an index to determine if said record is stored in a database;
      circuitry for creating said record in response to said record not being identified in said index;
      circuitry for assigning a database identification to said created record;
      circuitry for creating an entry in said index to store metadata of said created record, wherein said database identification forms part of said metadata;
      circuitry for deleting or updating said record in response to said record being identified in said index; and
      circuitry for rebalancing a load capacity of a plurality of servers of said database system holding a plurality of databases based on server load in response to one of said creating, deleting and updating said record.

8. The system as recited in claim 7, wherein said processor further comprises:
   circuitry for tracking data load of said plurality of servers holding said plurality of databases.

9. The system as recited in claim 8, wherein said processor further comprises:
   circuitry for storing said created record on one of said plurality of databases based on said data load of said plurality of servers.

10. The system as recited in claim 7, wherein said processor further comprises:
    circuitry for updating said index in response to said deleting or updating of said record.

11. The system as recited in claim 7, wherein said processor further comprises:
    circuitry for updating said index in response to said rebalancing of said load capacity of said plurality of servers.

12. The system as recited in claim 7, wherein said index comprises metadata indicating record location, status and parent/child relationships.

* * * * *